No Printed Specification Available
6660X
J. R. Post,
Door and Window Bolt.
Patented July 21, 1831.
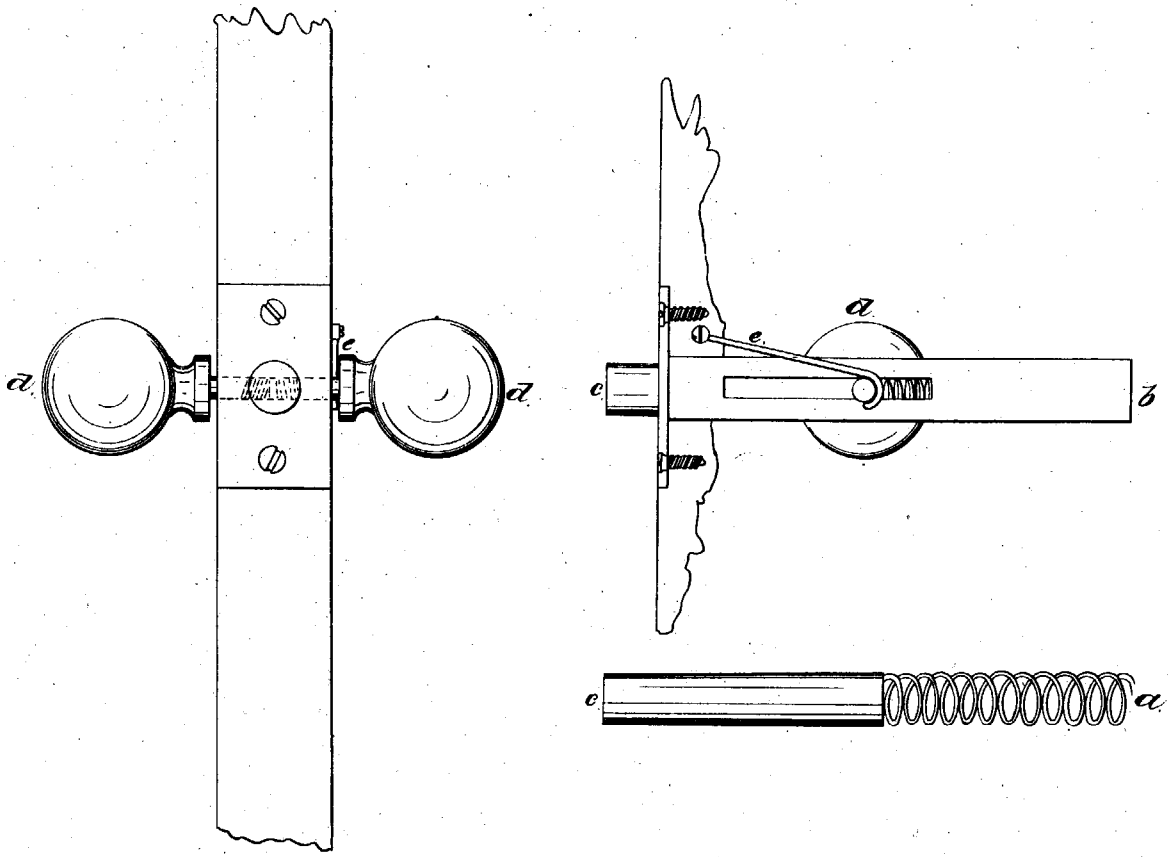
N. PETERS, PHOTO-LITHOGRAPHER, WASHINGTON, D. C.

July 21, 1831 [illegible]

6660X

James R. Post
Letters Patent

The Schedule referred to in these Letters Patent and making part of the same containing a description in the words of the said James R. Post himself of his improvement in the mode of fastening windows & doors.

---

The improvement consists of a spiral spring to be applied to doors or windows for the purpose of raising, lowering & securing the same at night. The spring is of a spiral form and placed within a metallic or wooden barrel of such length as may be required. The sash of the window or lock rail of the door is to be bored, or mortised so as to admit the barrel or tube to be placed within the same as a mortised lock; with a bolt on which the spring operates and falls into the jamb casing with which is connected a knob & escutcheon on each side of the door with a hook to throw over the knob on the inside of the door to secure the same Witnesses
J. W. Hardiman
Henry Ryer James R. Post Exd [illegible]

182 words